(12) United States Patent
Endo et al.

(10) Patent No.: US 6,407,726 B1
(45) Date of Patent: Jun. 18, 2002

(54) METHOD FOR DRIVING DISPLAY DEVICES, AND DISPLAY DEVICE

(75) Inventors: Hiroaki Endo; Hiroshi Murayama, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/223,816

(22) Filed: Dec. 31, 1998

(30) Foreign Application Priority Data

Jan. 6, 1998 (JP) .......................................... 10-000855

(51) Int. Cl.[7] ................................................. G09G 3/36
(52) U.S. Cl. .............................. 345/87; 345/90; 345/32; 345/84; 349/117; 349/75
(58) Field of Search ............................. 345/87, 90, 32, 345/84; 349/117–120, 75

(56) References Cited

U.S. PATENT DOCUMENTS

| | | | | |
|---|---|---|---|---|
| 4,707,728 A | * | 11/1987 | Hurst ........................... | 358/12 |
| 5,659,411 A | * | 8/1997 | Nito et al. ................... | 349/117 |
| 5,715,029 A | * | 2/1998 | Fergason .................... | 349/196 |

FOREIGN PATENT DOCUMENTS

| | | | | | |
|---|---|---|---|---|---|
| JP | 408029779 A | * | 2/1996 | ......... | G02F/1/1335 |
| JP | 409054554 A | * | 2/1997 | ............. | G09F/9/00 |

* cited by examiner

Primary Examiner—Bipin Shalwala
Assistant Examiner—Jimmy H. Nguyen
(74) Attorney, Agent, or Firm—Jay H. Maioli

(57) ABSTRACT

A method and apparatus for driving a display device having a liquid crystal, plasma or electroluminescence unit or the like, wherein: when a display device consisting of display elements having discrete fixed pixels and wobbling elements for wobbling a light beam emitted from the display elements is to be driven, the timing of sampling while scanning a first field and the timing of sampling while scanning a second field are shifted by a period of time $\Delta t$ corresponding to the amount of pixel shift $\Delta L x$ resulting from the wobbling, and the display elements are applied with the shifted timings of sampling, with the result that a high resolution interlace display compatible with the NTSC system or the HD system is made possible. In display devices having a liquid crystal display unit, plasma display unit, and electroluminescence display unit, interlace display capable of effecting the NTSC color television system or the HDTV system with high resolution is made possible.

13 Claims, 9 Drawing Sheets

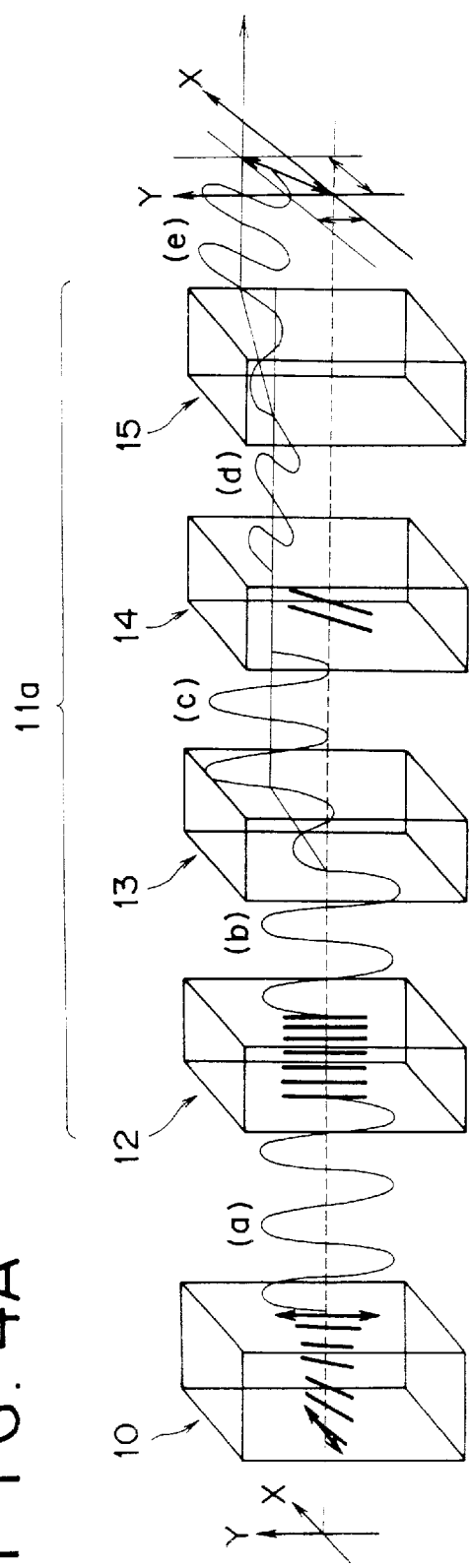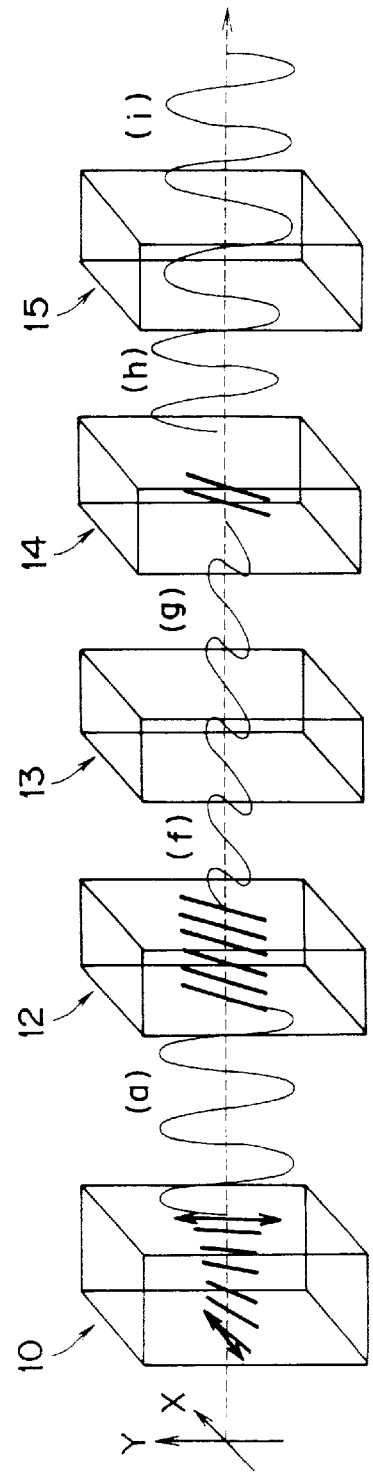
FIG. 4A
FIG. 4B

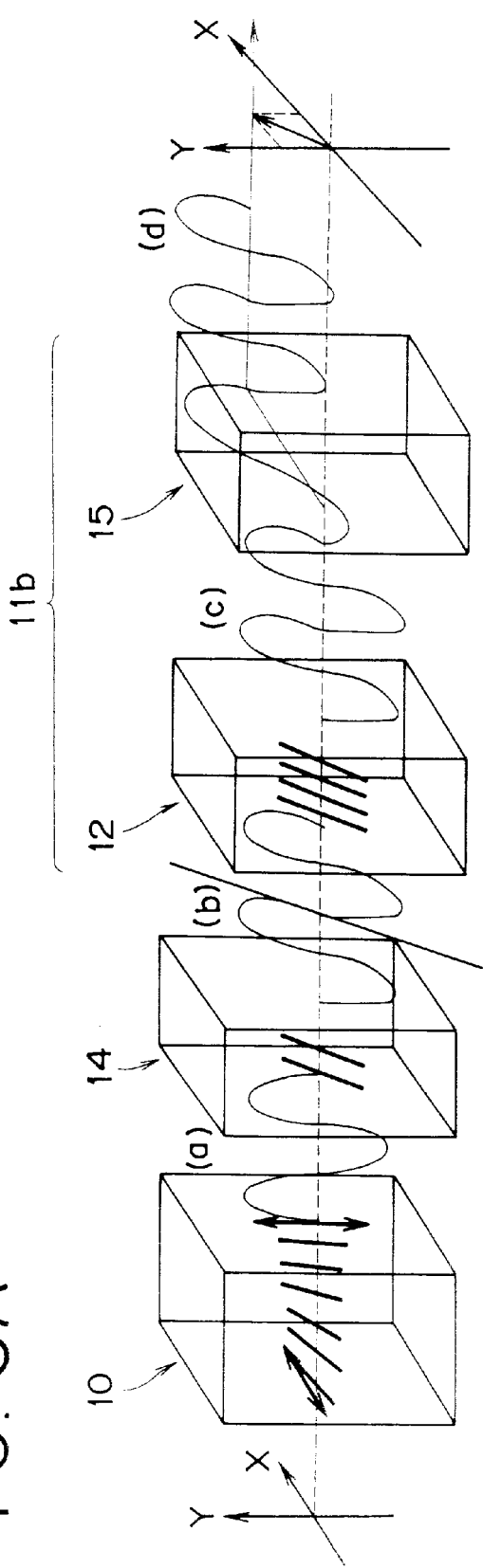
F I G. 6A
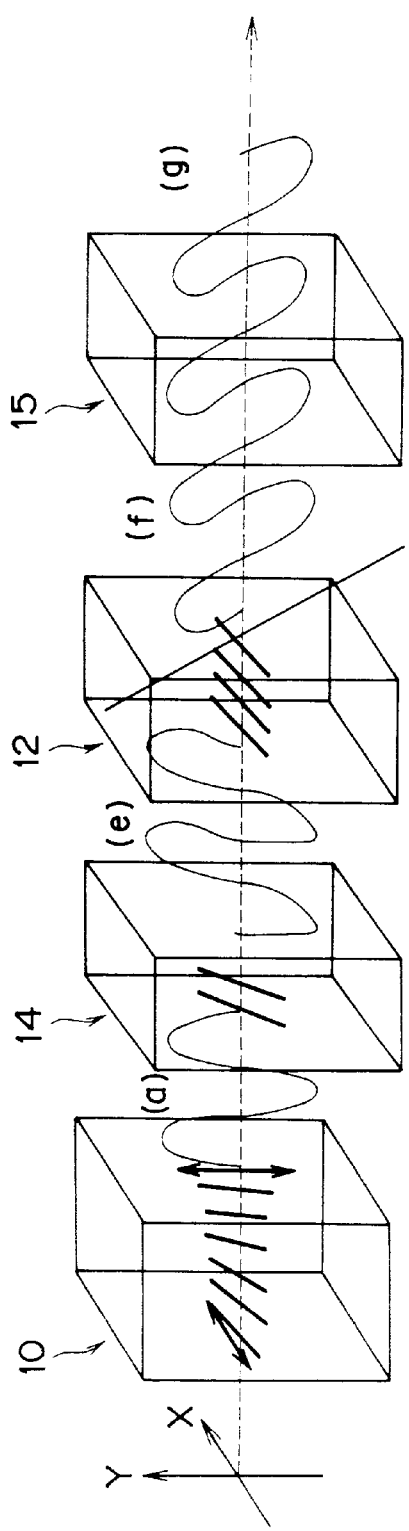
F I G. 6B

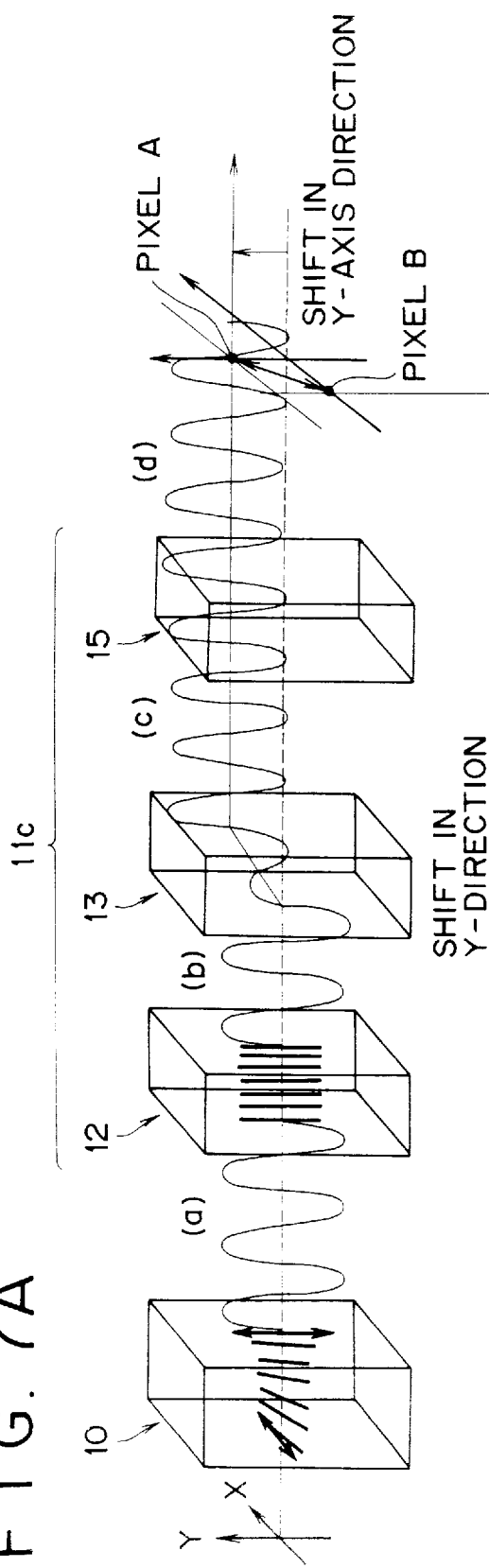
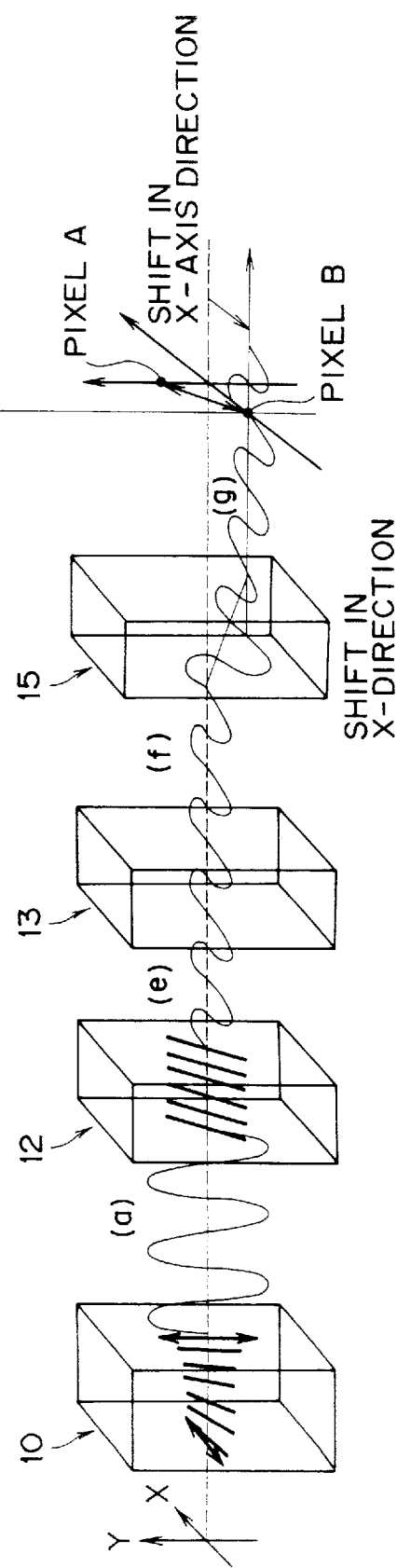

x (HORIZONTAL DIRECTION)

y (VERTICAL DIRECTION)

METHOD FOR DRIVING DISPLAY DEVICES, AND DISPLAY DEVICE

BACKGROUND OF THE INVENTION

1. Field of the Invention

The present invention relates to a method for driving display devices having discrete fixed pixel arrays such as liquid crystal units, plasma units and electroluminescent (EL) units, and a display device itself.

2. Description of the Related Art

Electronic display devices can be regarded as electronic devices for visually communicating a variety of information from various kinds of electronics to humans, or as electronic tools for electronic and visual exchange of information between humans. Electronic display devices in information-intensive society are widely used in various application areas, whether industrial or for consumer use, and are playing very important roles.

Recently, liquid crystal displays, plasma displays and electroluminescent displays have become objects of active research and development initiatives as electronic display devices to replace CRTs. Further, for example, attempts are being made to realize flat-type large display units with a 40 to 60 inch screen, such as liquid crystal projectors and plasma display units, using a high definition (HD) system.

However, display devices having discrete fixed pixel arrays and driven by a line sequential system, such as liquid crystal displays, plasma displays and electroluminescent displays, have a problem of being unable to simply comply with interlaced scanning when an NTSC color television system or a HD (particularly the so-called "High Vision") system is to accomplish displaying by interlaced scanning. This problem is addressed by equipping the display device itself with a progressive circuit compatible with interlacing or by converting video signals into a non-interlace format by using memories and displaying the converted signals, but these solutions involve an expensive and complex system.

Further, in this case, the display device requires as many pixels, particularly as many vertical pixel lines, as the effective scanning lines of video signals, but, if the display device has only a smaller number of pixe lines than the effective scanning lines, such expediencies are resorted to as writing the odd field (a first field) and the even field (a second field) into the same pixel, or skipping some video signals when writing in. These expediencies result in a poorer vertical resolution of the display screen and inferior picture quality than the original video signals could otherwise provide.

As a possible solution to this problem, a display pixel shifting technique (the wobbling technique) is known as a way to enhance vertical resolution using the same pixels in a display unit having display elements consisting of discrete fixed pixels (see the Japanese Patent Laid-Open Publications Nos. 7-64046 and 7-104278).

This wobbling technique is a method whereby one field picture is displayed in a position different from another field picture by switching the optical axis of the first field scanning and that of the second field scanning with the phase modulation optical elements and a birefringent medium.

However, in the methods described in the Japanese Patent Laid-Open Publications Nos. 7-64046 and 7-104278, the vertical optical axis shift, in other words the enhancement of vertical resolution, is made possible by using signals synchronized with interlacing in the first and second fields, but the horizontal resolution of display cannot be enhanced more than the number of pixels allows, even if the video signals have a broad band, because the resolution of fixed pixels is restrained by their number.

Thus, enhancement of the horizontal resolution of a display device having discrete fixed pixel arrays such as a liquid crystal display unit has its inevitable limit because the horizontal resolution is restricted by sampling and, therefore, displaying of interlace signals as they are would only result in displaying of the same picture shifted in the horizontal direction.

SUMMARY OF THE INVENTION

The present invention has been attempted in view of the above-described circumstances, and its object is to provide a method for driving a display device and a display device itself having display elements with fixed pixel arrays, permitting interlace display and enhancement of the horizontal resolution in particular.

The inventors of the present invention, in their dedicated pursuit of a solution to the above-mentioned problem, have found that when high resolution is to be realized in interlace display or the like with display elements having discrete fixed pixels and wobbling elements, interlace display is made possible and high resolution realized by shifting the timing of sampling while scanning a first field (the odd field, for example) and that of sampling while scanning a second field (the even field, for example) by a period of time corresponding to the amount of pixel shift resulting from wobbling and the sampled signal to the above-described display elements with the shifted timings.

Thus, the present invention pertains to a method for driving a display device (hereinafter called the invented driving method), said display device comprising:

display elements having discrete fixed pixels; and wobbling elements for wobbling a light beam emitted from said display elements; wherein:

when the display device is to be driven, the timing of sampling while scanning a first field and that of sampling while scanning a second field are shifted by a period of time corresponding to the amount of pixel shift resulting from wobbling and the sampled signal to said display elements with the shifted timings.

According to the invented driving method, when a display device comprising said display elements and said wobbling elements is to be driven, interlace display or the like compatible with the NTSC system or the HD system can be realized with high resolution, because the timing of sampling while scanning the first field and that of sampling while scanning the second field are shifted by a period of time corresponding to the amount of pixel shift resulting from wobbling (i.e. the period of time required for wobbling) and applying the sampled signal to said display elements with the shifted timings.

In particular, since the invented driving method makes possible realization of interlace display or the like with high resolution, especially in the horizontal direction, by merely shifting the timing of sampling while scanning the first field and that of sampling while scanning the second field by a prescribed period of time (phase), compatibility with the NTSC system or the HD system can be achieved without having to modify hardware configuration, such as providing progressive circuits compatible with interlacing. Furthermore, since pixel shifting in an oblique direction (hereinafter, it may be called oblique wobbling) is made possible, even higher resolution can be realized.

Furthermore, the present invention provides a display device capable of realizing the inventive driving method (hereinafter called the invented display device) comprising:

display elements having discrete fixed pixels;

wobbling elements for wobbling a light beam emitted from said display elements;

a timing generating circuit for shifting the timing of sampling while scanning a first field and the timing of sampling while scanning a second field by a period of time corresponding to the amount of pixel shift resulting from the wobbling; and driver circuits for driving said display elements and said wobbling elements in each of said fields with timing signals generated by the timing generating circuit.

The invented display device, since it comprises:

display elements having discrete fixed pixels, such as liquid crystal, plasma or electroluminescent elements;

wobbling elements for wobbling a light beam emitted from these display elements;

a timing generating circuit for shifting the timing of sampling while scanning a first field and the timing of sampling while scanning a second field by a period of time corresponding to the amount of pixel shift resulting from the wobbling; and driver circuits for driving said display elements and said wobbling elements in each of said fields with timing signals generated by the timing generating circuit, makes possible interlace display or the like compatible with the NTSC system or the HD system, particularly with high resolution, by merely shifting the timings of sampling in the timing generating circuit by a prescribed period of time without having to modify the hardware configuration of the display device.

BRIEF DESCRIPTION OF THE DRAWINGS

FIGS. 4A–4B are schematic views showing wobbling elements according to the invention.

FIGS. 6A–6B are schematic views showing still other wobbling elements according to the invention.

FIGS. 7A–7B are schematic views showing yet other wobbling elements according to the invention.

DETAILED DESCRIPTION OF THE PREFERRED EMBODIMENT

In the driving method and the display device according to the present invention, said period of time ($\Delta t$) corresponding to said amount of pixel shift should desirably be a period of time corresponding to the amount of pixel shift ($\Delta Lx$) in the horizontal direction resulting from said wobbling. $\Delta t$ and $\Delta Lx$ may be deemed to be in a substantially proportional relationship.

Further, it is desirable to generate said wobbling for the period of time of the synchronization signal for the scanning of each of said fields, and to perform vertical pixel shifting (i.e. to perform oblique wobbling) and said horizontal pixel shifting simultaneously.

Figure 1:
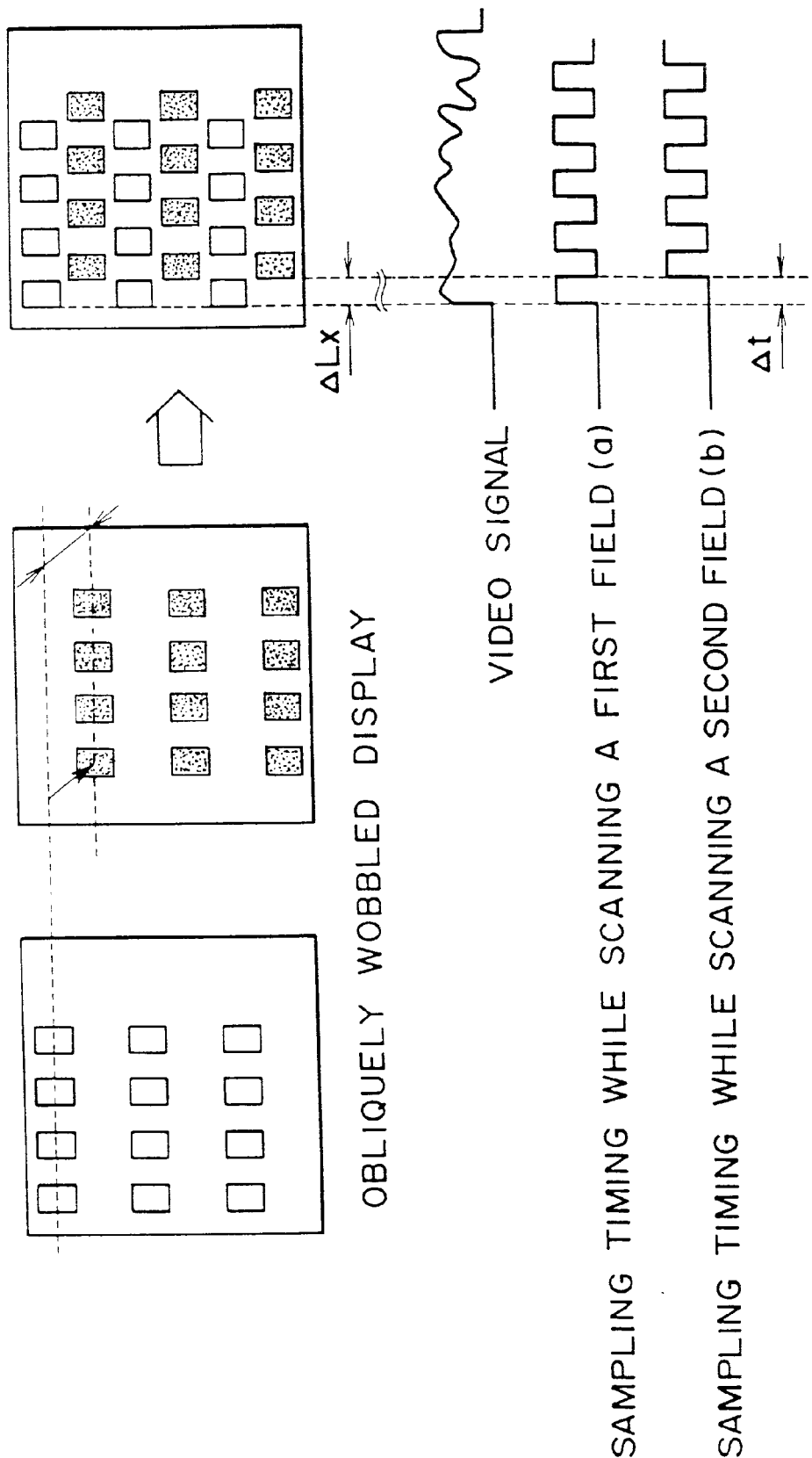
FIGS. 1A–1C are comprises schematic diagrams showing an oblique wobbling process by two-dimensional optical path shifting according to the present invention.
Figure 2:
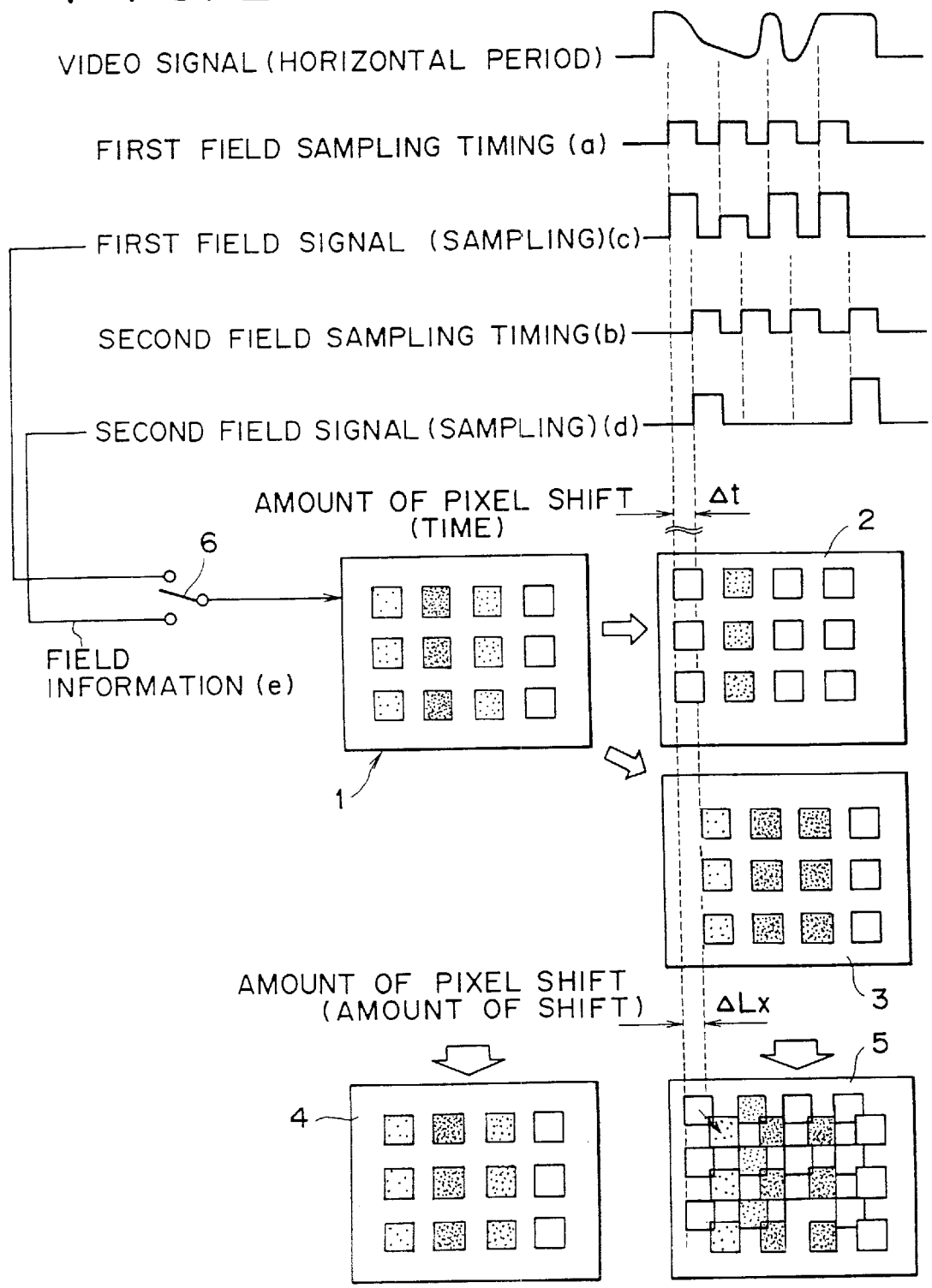
FIG. 2 is a schematic diagram showing correspondence between the timing of sampling and the display picture for displaying interlace video signals on fixed pixel display elements according to the invention.

Here is described a method for driving the invented display device with reference to FIGS. 1 and 2. Incidentally, FIGS. 9A–9C illustrate a method for processing interlace signals.

Figure 9A:
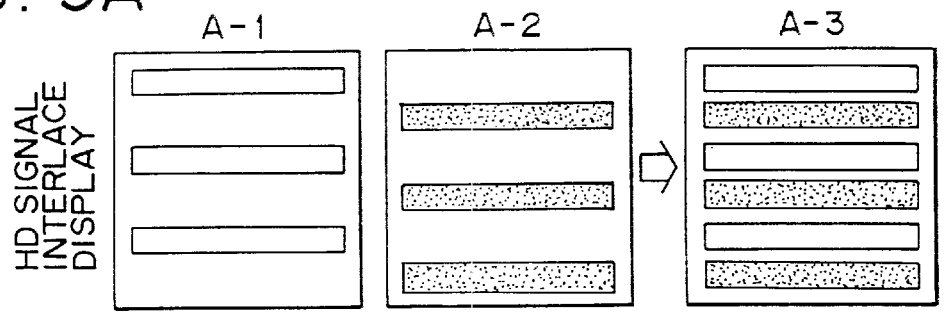
FIGS. 9A–9C are schematic diagrams showing a conventional method for processing interlace signals.
Figure 9B:
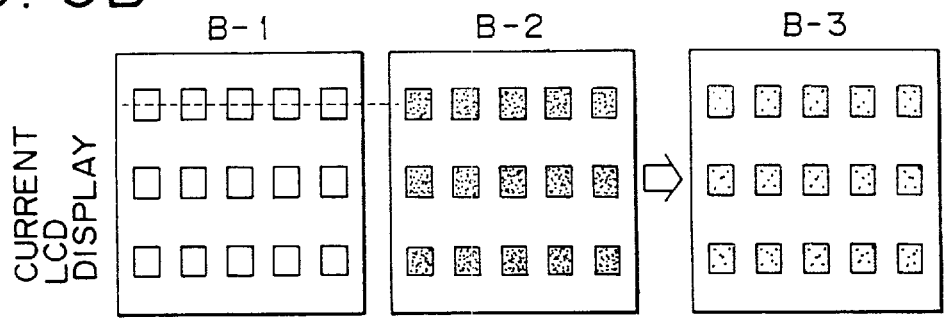
Figure 9C:
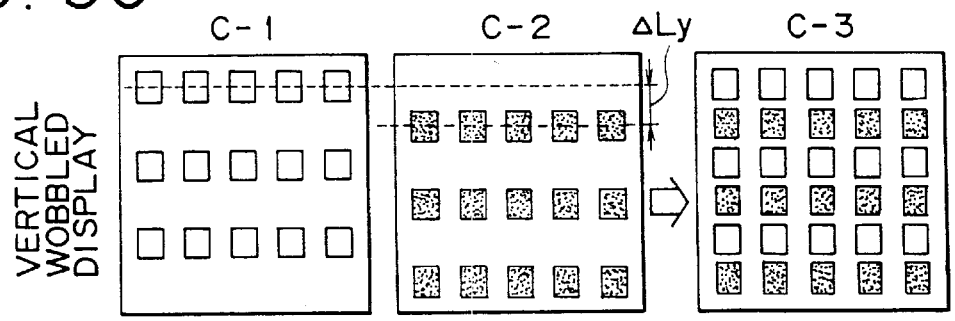

FIGS. 9A and 9B show examples of interlace displaying particularly with HD signals (9A), interlace signals displayed by currently available liquid crystal display (hereinafter it may be called LCD) elements (9B), and displaying by LCD elements where a vertical wobbling technique is applied (9C).

Recently, as a result of technical advancement in enhancing the resolution of liquid crystal panels, panels that can display all the scanning lines though only for vertical resolution of NTSC signals (up to about 480 lines) have become commercially available, even including small sized liquid crystal panels suitable for projectors and the like, but since such panels compatible with high resolution signals including HD signals are complex and costly, currently used LCDs present displays such as shown in FIG. 9B.

First, as shown in FIG. 9A, an interlace signal such as an HD signal constitutes one frame of picture (A-3) consisting of two field pictures, a picture (A-1) during the scanning of a first field (the odd field, for example) and the picture (A-2) during the scanning of a second field (the even field, for example), and a full frame is visually formed by the interlace effect.

However, in the current way of LCD displaying, both the picture (B-1) during the scanning of a first field and that (B-2) during the scanning of a second field are displayed on the same pixels as shown in FIG. 9B with the result that both vertical resolution and horizontal resolution are extremely poor.

In this LCD display, as a method for proper interlacing in the vertical direction, the wobbling technique described above is known. This process forms a full frame of picture (C-3) wherein, as shown in FIG. 9C, interlace display is performed with the picture (C-1) during the scanning of a first field and that (C-2) during the scanning of a second field, the latter being shifted by an amount of $\Delta Ly$ from the picture (C-1), by performing pixel shifting based on the aforementioned vertical optical path shifting (vertical wobbling) with LCD pixels kept as they are.

As distinguished from this process, FIGS. 1A to 1C shows two-dimensional optical path shifting (oblique wobbling) according to the invented driving method. Further, this is an example in which a full frame of picture shown in FIG. 1C is formed by performing the first field scanning without wobbling as shown in FIG. 1A and the second field scanning by oblique wobbling as shown in FIG. 1B.

Thus, oblique wobbling display according to the invented driving method is accomplished in the vertical direction by interlace displaying with the first field scanning and the second field scanning by said vertical wobbling, and in the horizontal direction, unlike in this vertical wobbling, by shifting the timing of sampling (b) during the second field scanning from the timing of sampling (a) during the first field scanning by a period of time (phase) $\Delta t$, corresponding to the amount of pixel shift $\Delta Lx$ in the horizontal direction resulting from wobbling.

FIG. 2 shows the correspondence between the timing of sampling and the display picture for displaying picture signals by interlace displaying on fixed pixel display elements. In addition, it is supposed that picture signals (in a horizontal period) do not change in the vertical direction, but gradation differences exist only in the horizontal direction. Furthermore, $\Delta t$ represents the amount of pixel shift (time), and $\Delta Lx$, the amount of even pixel shift by wobbling.

Here, as shown in FIG. 2, picture signals (in a horizontal period) are sampled at the first (odd) field sampling timing (a), having a phase difference $\Delta t$ corresponding to the amount of the even pixel shift $\Delta Lx$, and the second (even) field sampling timing (b).

At this time, a first field signal (c) is displayed on a fixed pixel display element 1 during first field scanning, and in order not to let optical path shifting take place then, field information (e) is given to wobbling elements to form a display picture 2 in the first field.

On the other hand, during the second field scanning, a sampled second field signal (d) is displayed on the display element land forms a second field display picture 3, and optical path shifting (wobbling) by the field information (e) results in pixel shifting in an oblique direction. Reference numeral 4 in FIG. 2 denotes the display picture (frame) not obliquely wobbled.

Then, an obliquely wobbled display picture (frame) 5, consisting of the first field display picture 2 and the second field display picture 3, can reproduce high frequency signal components that even pixel lines of the original fixed pixel display element 1 cannot display, with the result that the first field sampling signal, having a phase difference ($\Delta t$) corresponding to the amount of even pixel shift (or optical path shift; the same applies hereinafter) $\Delta Lx$ and the second field sampling signal are sampled at different sampling points, making oblique wobbling possible and thereby enhancing resolution in the horizontal direction (resolution in the vertical direction as well). Reference numeral 6 in FIG. 2 denotes a switch which schematically illustrates switching between the first field and the second field.

Next, in the invented driving method and display device, said amount of the pixel shift should preferably be such an amount as minimizes the overlap between said fixed pixels and the pixels shifted by said wobbling.

Figure 3:
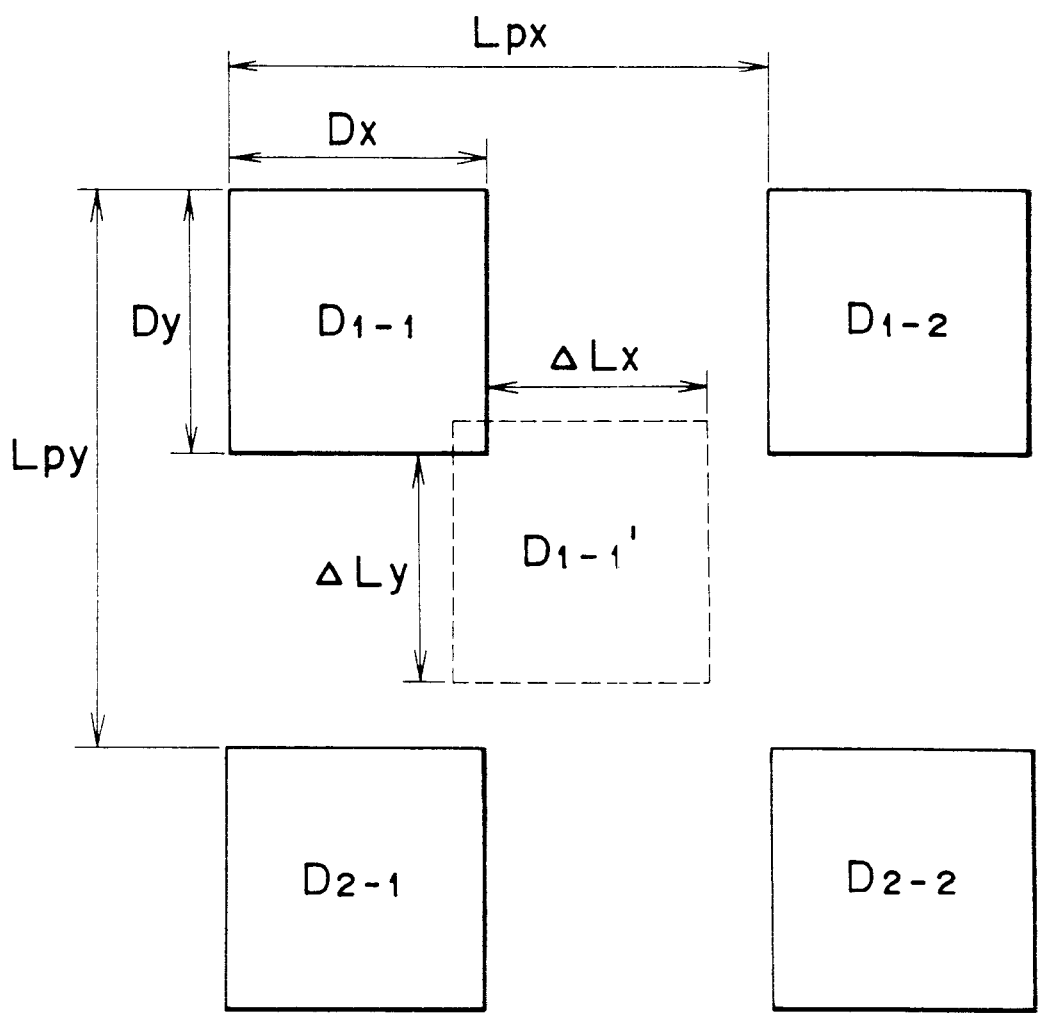
FIG. 3 is a schematic diagram showing fixed pixel display elements.

More specifically, as shown in FIG. 3, in a display element having fixed pixels D1-1, D1-2, D2-1 and D2-2, the amount of pixel shift in the vertical direction represented by $\Delta Ly$ and the amount of pixel shift in the horizontal direction represented by $\Delta Lx$ should desirably satisfy Equations A and B given below, where D1-1' denotes the wobbled product of the pixel D1-1:

$$Min(Lpy-Dy, Dy/2) \leq \Delta Ly \leq Max(Dy, Lpy-Dy/2) \quad \text{Equation A}$$

and $$Min(Lpx-Dx, Dx/2) \leq \Delta Lx \leq Max(Dx, Lpx-Dx/2) \quad \text{Equation B}$$

[In Equations A and B above:
Lpy is the vertical pitch length of a fixed pixel,
Lpx is the horizontal pitch length of a fixed pixel,
Dy is the vertical aperture of a fixed pixel,
Dx is the horizontal aperture of a fixed pixel, and
Min (a, b) and Max (a, b) are functions which give the smallest and largest values of a and b, respectively.]

Further, in the invented driving method and display device, said wobbling element may be, for example, a phase modulation optical element, such as a ferroelectric liquid crystal element, or an optical element consisting of a birefringent medium of anisotropic crystal (quartz or the like in particular).

This wobbling element, as shown in FIGS. 4A–4B, maybe formed, for example, of a phase modulation optical element 12 (FLC: ferroelectric liquid crystal), a first birefringent medium (quartz) 13, a half-wave plate ($\lambda/2$ plate) 14; and a second birefringent medium (quartz) 15, sequentially disposed on the optical axis of a light beam emitted from a display element 10. With these elements provided, it is desirable that, in one field scanning, the polarization plane of a light beam (c) having passed the first birefringent medium 13 be rotated by 90 degrees by the half-wave plate 14 and led to the second birefringent medium 15, and the horizontal pixel shift and the vertical pixel shift be performed independently of each other by the birefringent medium 13 and the second birefringent medium 15, respectively.

Here is described the principle of wobbling with reference to FIGS. 4A and 4B.

In FIGS. 4A and 4B, whereas a light beam emitted from a light source (not shown) is gradationally displayed by a display element 10 of a polysilicon TFT liquid crystal (p-Si-TFT-LCD) panel or the like, the light beam emitted from the display element 10 is linearly polarized, and this polarization is determined by the orientation of the crossed Nicol prisms of a polarizing plate (not shown) either adhered or placed before or behind the liquid crystal panel.

However, FIGS. 4A and 4B illustrate an example in which a light beam polarized in the vertical direction (i.e. the polarization plane is in the Y-axis direction) is emitted. Further, this is an example in which wobbling is done during the first field scanning (A) but not done during the second field scanning (B).

First, as shown in FIG. 4A, during the first field scanning, a light beam (a) emitted from the display element 10, for example, is not subjected to phase modulation by the phase modulation optical element 12, consisting of a ferroelectric liquid crystal element(FLC), and with its polarization plane kept as it is, comes incident on the first birefringent medium 13.

Then, since the polarization plane of a light beam (b) coming incident on the birefringent medium 13 includes an extraordinary optical axis, the light beam (b) deflects in the direction of the inclination of the extraordinary optical axis of this birefringent medium 13 shifts (shifting in the Y-axis direction). Incidentally, the amount of shift here is $\Delta Ly$.

Then, a light beam (c) shifted (changed in optical axis) in the Y-axis direction by the first birefringent medium 13 is rotated by 90 degrees by the polarizing optical element 14 consisting of a half wave plate (½ wave plate or $\lambda/2$ plate), for example, and comes incident on the second birefringent medium 15 consisting of a quartz plate, for example.

Next, since the birefringent medium 15 is disposed so as to include an extraordinary optical axis in the X-axis direction now, a light beam (d) coming incident on the second birefringent medium 15 is shifted in the X-axis direction and emitted [light beam (e)]. Incidentally, the amount of shift here is $\Delta Lx$.

In this way, during the first field scanning (A), the pixel shift (i.e. oblique wobbling) takes place eventually in both the X- and Y-axis directions.

On the other hand, as shown in FIG. 4B, during the second field scanning, a light beam (a) emitted from the display element 10 is similarly subjected to a 90 degree rotation of its polarization plane from the vertical direction to the horizontal direction through phase modulation by the phase modulation optical element 12, and comes incident on the birefringent medium 13, but this incident light beam (f), as it does not include the extraordinary optical axis of the first birefringent medium 13 in its incident polarization plane, it is not deflected by the birefringent medium 13 (i.e. undergoes no pixel shift or optical axis change), and emitted as it is.

Then, this light beam (g) is turned into a light beam (h), whose polarization plane is rotated by 90 degrees by the polarizing optical element 14 consisting of a half-wave plate, and emitted into the second birefringent medium 15. Here again, since the polarization plane of the light beam (f) also does not include the extraordinary optical axis of the second birefringent medium 15, no pixel shift (optical axis change) takes place, and the beam is emitted intact as a light beam (i)

In this manner, during the second field scanning (B), no pixel shift (wobbling) takes place.

To add, the timing of sampling of the display element 10 (fixed pixel display panel) should be matched with the amount of horizontal pixel shift and, since the amount of vertical shift is determined by interlace signals and the pixel pitch, it is particularly desirable to control the amounts of shifts in the X- and Y-axis directions independently by using two birefringence media as described above. Furthermore, this makes possible independent use of wobbling in the horizontal direction and that in the vertical direction as commanded by video signal standards or the like.

Incidentally, although the pixel shift is performed in the horizontal and vertical directions separately by using two birefringence media in the above-described example, similar pixel shifts may as well be accomplished using a single quartz plate in another configuration wherein a linearly polarized light beam emitted from a liquid crystal panel is slanted in the orientation of the crossed Nicol prisms of the polarizing plate, with the direction of the extraordinary optical axis of the quartz plate rotated in advance to match the oblique direction.

Thus, said wobbling element may be composed of a phase modulation optical element and the birefringent medium arranged sequentially, and the configuration may as well be so disposed as to cause the optical axis to be shifted in the oblique direction so that the polarization plane of said light beam emitted from said display element be oblique.

Figure 5A:
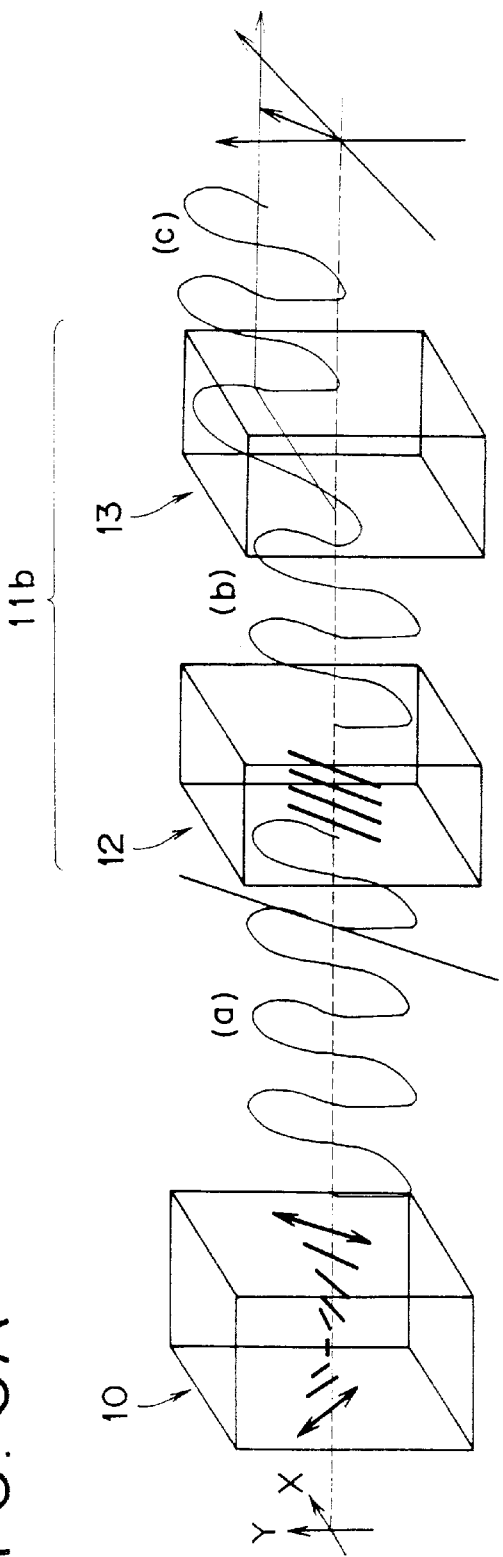
FIGS. 5A–5B are schematic views showing other wobbling elements according to,the invention.
Figure 5B:
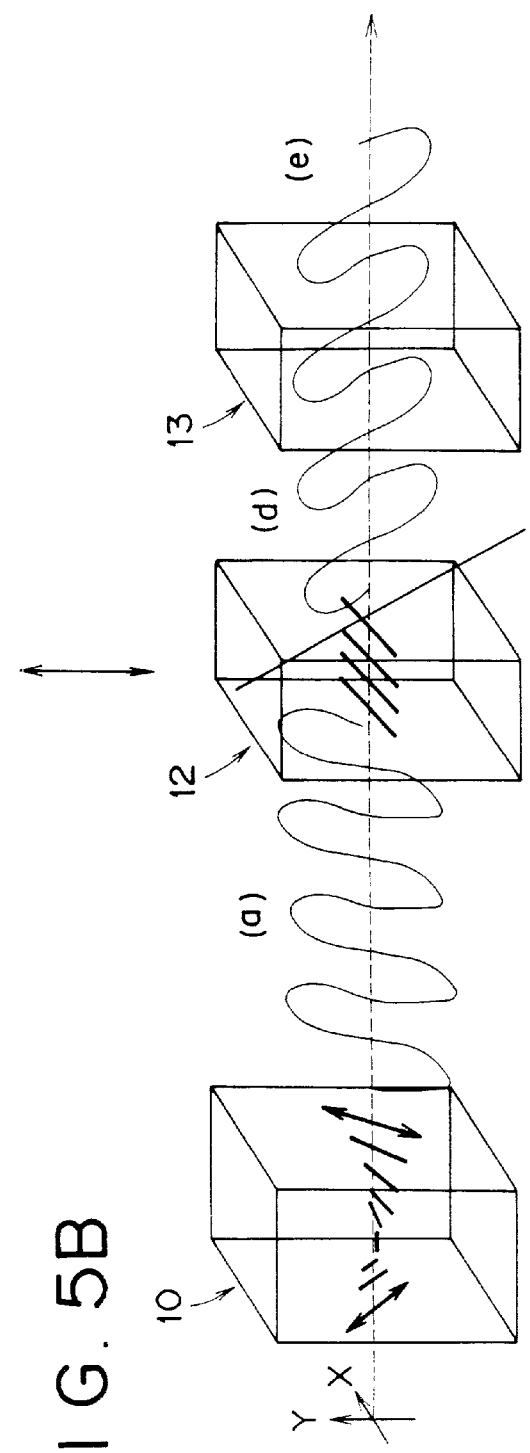

More specifically where, as shown in FIGS. 5A and 5B, the light beam emitted from the display element 10 is a light beam (a) whose polarization plane is in an oblique direction (it can be realized by controlling the orientation of a polarizing plate disposed in front of or behind the display element 10) and the wobbling element 11b consists of the phase modulation optical element 12 and the birefringent medium 13 sequentially disposed on the optical axis of the light beam (a) emitted from the display element 10, the light beam (a), having polarization plane in the oblique direction and emitted from the display element 10, passes the phase modulation optical element 12 without its polarization plane being rotated during the first field scanning as shown in FIG. 5A; the optical axis of a light beam (b) is then shifted in one (oblique) direction by the birefringent medium 13, and is emitted as a light beam (c). On the other hand, during the second field scanning, as shown in FIG. 5B, the initially oblique polarization plane of the light beam (a) is rotated by 90 degrees by the phase modulation optical element 12, and the optical axis of a light beam (d) is not shifted by the birefringent medium 13 and emitted from the wobbling element 11b, with the result that the optical axis of a light beam (e) emitted from the display element 10 is shifted in the oblique direction between the first field scanning and the second field scanning.

Or, said wobbling element may consist of a phase modulation optical element and a birefringent medium disposed sequentially; a half-wave plate for adjusting the phase of said light beam, be disposed on the optical axis of the light beam emitted from said display element; and the polarization plane of said light beam emitted from said display element, be slanted so that the optical axis be shifted in the oblique direction.

More specifically, as shown in FIGS. 6A and 6B, the half-wave plate 14 is disposed between the display element 10 and the wobbling element 11b; the polarization plane of a light beam (a) emitted from the display element 10 is rotated by 90 degrees by the half-waveplate 14 during the first field scanning, as shown in FIG. 6A; then, a light beam (b) emitted from the half-wave plate 14, having its polarization plane in the oblique direction, passes the phase modulation optical element 12 with its polarization plane not rotated; further, the optical axis of a light beam (c) is shifted in one (oblique) direction by the birefringent medium 15, and the shifted beam is emitted as a light beam (d) Meanwhile, during the second field scanning, the polarization plane of the light beam (a) emitted from the display element 10 is rotated by 90 degrees by the half-wave plate ($\lambda$/2 plate) 14 as shown in FIG. 6B; the initially oblique polarization plane of the optical axis of a light beam (e) emitted from the half-wave plate 14 is not rotated by the phase modulation optical element 12; and, since the optical axis of a light beam (f) is not shifted by the birefringent medium 15, the optical axis of a light beam (g) emitted from the display element 10 is shifted in the oblique direction between the first field scanning and the second field scanning.

Further, said wobbling element may be composed of the phase modulation optical element and the first and second birefringent media disposed sequentially, and the configuration may as well be so arranged that pixel shifts in the vertical and horizontal directions be performed independently by said first and second birefringence media.

More specifically where, as shown in FIGS. 7A and 7B, the display element 10 consists of a phase modulation optical element 12, a first birefringent medium 13 and a second birefringent medium 15 disposed sequentially on the optical axis of the light beam emitted from the display element 10, the polarization plane of a light beam (a) emitted from the display element 10 passes the phase modulation optical element 12 with its polarization plane not rotated during first field scanning as shown in FIG. 7A; then, the optical axis of a light beam (b) is shifted in one (Y-axis) direction by the first birefringent medium 13; and, as the optical axis of a light beam (c) passes the second birefringent medium 15 with its optical axis not shifted, a light beam (d) is shifted in the Y-axis direction relative to the light beam (a). Meanwhile, during the second field scanning, as shown in FIG. 7B, the polarization plane of the light beam (a) emitted from the display element 10 is rotated by the phase modulation optical element 12; then, though the first birefringent medium 13 passes a light beam (e) without shifting its optical axis, the second birefringent medium 15 does shift the optical axis of a light beam (f) in the other (X-axis) direction and emits the shifted beam as a light beam (g), with the result that a pixel A observed during the first field scanning and a pixel B observed during the second field scanning are found shifted in the oblique direction.

Further, the inventive driving method display device should desirably be applied to a projector device (particularly to a liquid crystal projector device). In such an application, it is desirable to dispose a quarter-wave plate on the optical axis of said light beam at a stage following said wobbling element. To dispose a quarter-wave plate following the wobbling element is particularly effective in reducing flickers in a rear projector device according to the present invention as shown in FIG. 8.

Next, a preferred embodiment of the present invention will be described with reference to FIG. 8.

Figure 8:
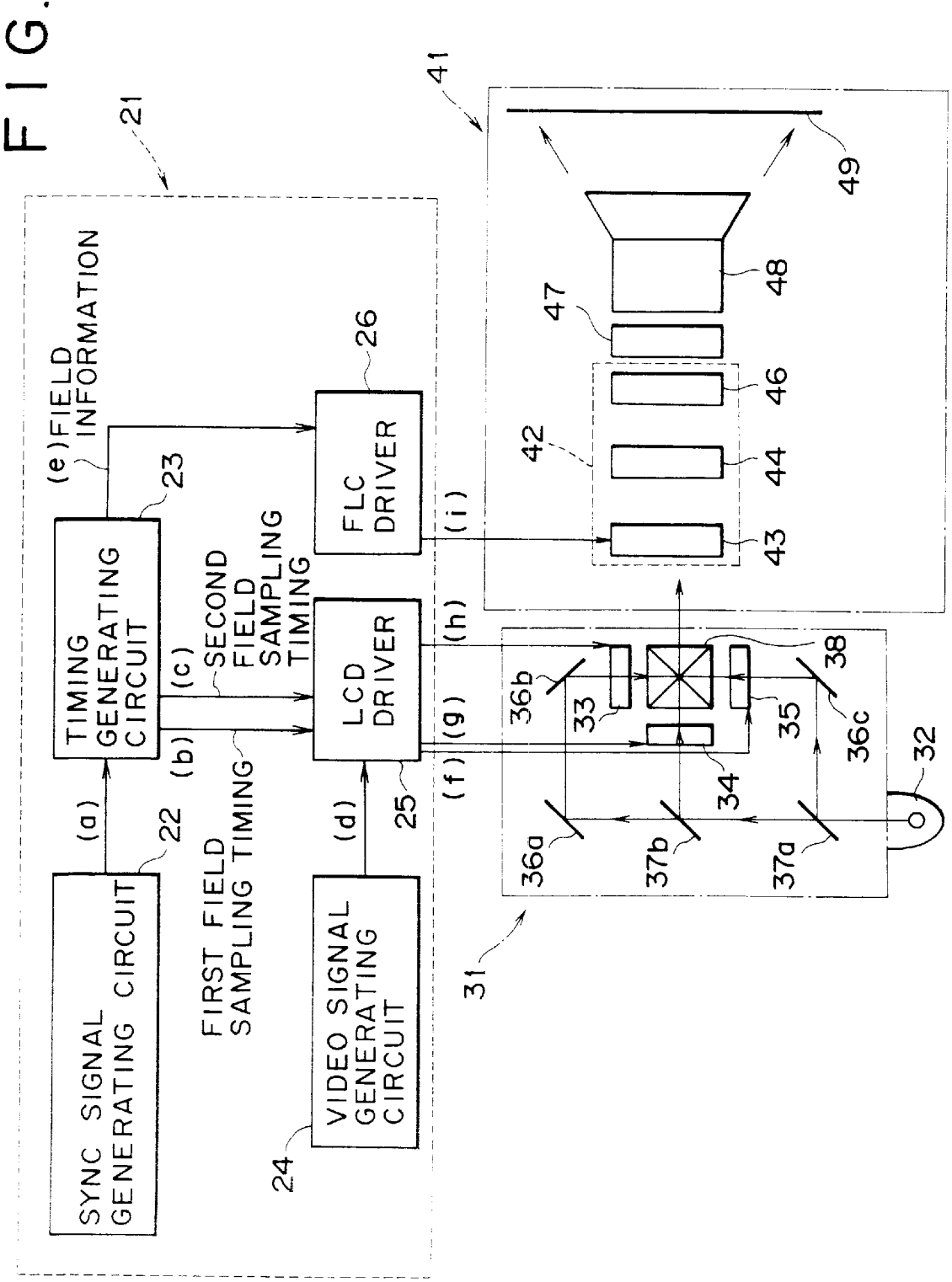
FIG. 8 is a schematic diagram showing a projector device according to the invention.

A projector device shown in FIG. 8 comprises an operating circuit system 21, a light source system 31, and a projection system 41 including a wobbling element 42. First, the light source system 31 and the projection system 41 will be described. Incidentally, the wobbling element 42 in FIG. 8 substantially corresponds to the wobbling element 11a in FIG. 4A.

This projector device is a three-plate type liquid crystal projector device provided with a lamp 32 in the light source system 31 for supplying light. It further has an optical system for dispersion into three primary colors including dichroic mirrors 37a and 37b, mirrors 36a, 36b, and 36c, and a pair of crossed prisms 38. It is also provided with an optical system including a display element including three liquid crystal panels [for example, polysilicon-thin film transistor (TFT) liquid crystal panels: hereinafter they may be called p-Si-TFT liquid crystal panels] 35, 34 and 33 corresponding to red (R), green (G) and blue (B).

In other words, a light beam emitted from the lamp 32 is sequentially separated into primary colors, red, green and blue, by dichroic mirrors 37a and 37b, and brought to incidence by the mirrors 36a, 36b, and 36c liquid crystal panels 35, 34 and 33 respectively corresponding to the three colors.

Further, in the projection system 41, the wobbling element 42 is provided with a ferroelectric liquid crystal (FLC) 43 to serve as a phase modulation optical element and quartz plates 44 and 46 as birefringent media.

Furthermore, the configuration is such that a light beam emitted from the crossed prisms 38 in the light source system 31 passes the wobbling element 42 in the projection system 41, and comes incident on a projection lens 48 via a λ/4 plate (quarter-wave plate) 47 to be projected here on a screen 49 in a prescribed projection size.

To add, polarizing plates (not shown) are disposed in crossed Nicol positions relative to each other before and behind the liquid crystal panels 35, 34 and 33. The liquid crystal panels display pictures gradated according to video signals. The light beam then emitted from the liquid crystals, as is well known, is linearly polarized by the polarizing plates. At this time, the liquid crystal panels and the polarizing plates are disposed so as to align the light beams of all the primary colors in their directions of linear polarization. The emitted light beams are synthesized by the crossed prisms 38, and brought to incidence on the FLC element 43. The FLC element 43 functions to switch the orientation of the polarization plane of the synthesized light beam relative to the optical axis between the horizontal and vertical directions in synchronism with the interlace signals.

Since the quartz plates 44 and 46 coming next are disposed so that their extraordinary optical axes be oriented respectively in parallel and orthogonal to the optical axis of the light beam emitted from the FLC element 43, pixel shifting is performed according to the switched state of the FLC element 43.

Pixel shifting (wobbling) in this example is accomplished by the quartz plates 44 and 46 in the horizontal and vertical directions, respectively. Then, the emitted light beam from the wobbling element 42 is kept vertically and horizontally polarized for the first and second fields, respectively, as switched by the FLC element 43, which is a phase modulation optical element.

Further, as the screen 49 has a brightness gain difference due to polarization, each field has its own brightness gain difference, which is sometimes detected as a flicker. Therefore, disposing a quarter-wave plate 47 behind the wobbling element 42 serves to prevent flickering by eliminating linear polarization and obviating gain differences in the screen 49 or the like due to the polarization. Then, the picture whose pixels are shifted in each field is projected onto the screen 49 with high accuracy.

Next, a traveling path of drive signals in FIG. 8 will be described.

A video signal (d) supplied from a video signal generating circuit 24 is led to an LCD driver 25, where video signals (f), (g), and (h) input to the liquid crystal panels 35, 34 and 33 are sampled at timings differing from field to field, including a first field sampling timing (b) and a second field sampling timing (c), generated by a timing generating circuit 23 on the basis of a sync signal (a) generated by a sync signal generating circuit 22 so that the phase Δt differ equivalently to the amount of horizontal pixel shift ΔLx.

Thus, the timing generating circuit 23 is a signal generating circuit capable of shifting the timing of sampling during the first field scanning and the timing of sampling during the second field scanning by a period of time (phase) corresponding to the amount of pixel shift resulting from wobbling. Further, the LCD driver 25 and the FLC driver 26 are driver circuits for driving the liquid crystal panels 35, 34 and 33, and the FLC element 43 field by field with a timing signal (field information) (e) generated by this timing generating circuit 23.

In this way, since the picture displayed on the liquid crystal panels presents signals shifted by the amount of horizontal pixel shift ΔLx in each field, and the FLC driver 25 drives the FLC element 43 with a sync signal (i) synchronized with the field information (e), the synthesized picture is enhanced in pixel density in the frame.

As described above, the embodiment of the present invention makes possible interlace displaying compatible with the NTSC system or the HD system without having to substantially modify the hardware configuration, including the arrangement of fixed pixel arrays of the display element. Further, the enhancement of resolution in the horizontal and vertical directions with the display element of fixed pixel arrays is made possible.

Furthermore, the digital television (DTV) standards planned for implementation provide for signals of many different levels of resolution including interlace and non-interlace (progressive) signals. In addition, display devices in the future may be required to be compatible with all kinds of signals. In order to display such signals on a fixed pixel panel, the number of pixels will have to be accomplished with signals, but this would entail deterioration of picture quality as described above. Even in such a case, according to the present invention, enhancement of resolution in the horizontal direction can be achieved with progressive signals, for example, by wobbling only in the horizontal direction, but not in the vertical direction, without interlace.

Further, where interlace displaying is to be performed, since writing can be done at the standard picture signal rate, it is unnecessary to write at a double speed so that the frequency band of the signal system would not have to be raised. Nor would be needed any picture signal memory for non-interlace displaying.

Moreover, the use of two or more birefringent media for optical path shifting (wobbling) makes it possible to independently adjust the amounts of optical path shifts (ΔLy, ΔLx), and also facilitates setting of the optimized amount of pixel shift for the pixel aperture shape of the display element. Incidentally, the pixel aperture of the display element pixel here is, for example, a part that is defined by the vertical dimension Dy and the horizontal dimension Dx shown in FIG. 3.

Further, the use of three wobbling elements for three display elements makes possible adjustment of the amount of optical path shift in the vertical and horizontal directions for each color, and accordingly adjustment for chromatic aberration or the like is also made possible.

Furthermore, disposing a quarter-wave plate between the wobbling elements and the screen serves to reduce flickering due to wobbling.

Although the present invention has been described with respect to an embodiment thereof, the invention is in no way limited to this embodiment.

For example, although the example described above is an optical system in which light beams are wobbled after being synthesized by the crossed prisms 38 using three panels, wobbling may be performed by three panels separately, with an FLC element arranged immediately behind each display element. In this case, three pairs each of FLC elements and quartz plates may be used, or alternatively three of FLC elements alone may be disposed, together with one quartz plate for light beams already synthesized by crossed prisms or the like.

Or, one wobbling element may be disposed between a projecting lens and a single plate display element in which the pixels of each color are arranged in a matrix. In particular, where a single-plate display element is used, provided that it has the same aperture rate as that of three plates, one panel can display all the three primary colors so that its own resolution is one third; the effect of this arrangement to improve resolution is enormous. Incidentally, the aperture rate here is, for example, the ratio of the space that is defined by the vertical dimension Dy and the horizontal dimension Dx of pixels to the space that is defined by the vertical pitch length Lpy and the horizontal pitch length Lpx of pixels shown in FIG. 3.

In addition, in this embodiment of the present invention, although a p-Si-TFT LCD is used as the display element, any element having dot-discrete pixel arrays, because it always involves sampling, can be expected to improve resolution equally. Thus, an electroluminescent display device, a plasma display device and the like, besides a liquid crystal panel device, can be used as each particular application requires.

Further, although wobbling is performed in the first field and the second field in the above-described embodiment, during each field scanning, wobbling by the invented driving method may be performed on each individual pixel or each block of pixels.

According to the invented driving method, when a display device comprising display elements having discrete fixed pixels and wobbling elements for wobbling a light beam emitted from said display elements is driven, the timing of sampling while scanning a first field and the timing of sampling while scanning a second field are shifted by a period of time corresponding to the amount of pixel shift resulting from wobbling, and the above-mentioned display elements are impressed with the shifted timings of sampling, with the result that interlace displaying compatible with the NTSC system or the HD system is made possible and high resolution realized.

Further, the invented display device according to the present invention comprises display elements having discrete fixed pixels; wobbling elements for wobbling a light beam emitted from said display elements; a timing generating circuit for shifting the timing of sampling while scanning a first field and the timing of sampling while scanning a second field for the period of time corresponding to the amount of pixel shift resulting from wobbling; driver circuits for driving said display elements and said wobbling elements in each of said fields with timing signal from the timing generating circuit with the result that interlace displaying compatible with the NTSC system or the HD system is made possible without having to modifying the configuration of the display device, and high resolution is realized.

What is claimed is:

1. A method for driving a display device including display elements having discrete fixed pixels driven by signals obtained by sampling video signals in each video field and wobbling elements for wobbling a light beam emitted from said display elements, comprising the steps of:

passing a light beam representing a sampled video signal from a light source through each display element and producing a linearly polarized light beam;

applying the linearly polarized light beam emitted by each display element to a respective wobbling element;

forming each said wobbling element using a phase modulation optical element, a first birefringent medium, a half-wave plate, a second birefringent medium disposed sequentially;

controlling said phase modulation element during a first field of said video signal, so as to impart no time shift caused by phase modulation;

rotating a polarization plane of a light beam having passed said first birefringent medium by 90 degrees by said half-wave plate to be led to said second birefringent medium;

performing pixel shifts in the vertical direction by an amount $\Delta Ly$ and in the horizontal direction by an amount $\Delta Lx$ independently of each other by said first birefringent medium and said second birefringent medium;

controlling said phase modulation element during a second field of said video signal so as to impart a time shift at corresponding to an amount of the pixel shift $\Delta Lx$ that was performed on the first field; whereby said step of performing pixel shifts is disabled for the second field, and performing again said step of rotating.

2. The method for driving a display device as claimed in claim 1, wherein said period of time corresponding to an amount of pixel shift corresponds to an amount of pixel shift in the horizontal direction resulting from said wobbling.

3. The method for driving a display device as claimed in claim 1, wherein said wobbling is generated for a period of time of a synchronizing signal used for scanning each of said video fields, and further comprising the step of performing a pixel shift in the vertical direction simultaneously with a pixel shift in said horizontal direction.

4. The method for driving a display device as claimed in claim 1, and further comprising the step of minimizing overlapping of said fixed pixels and the pixels shifted by said wobbling.

5. The method for driving a display device as claimed in claim 3, wherein the amount of pixel shift in the vertical direction represented by $\Delta Ly$ and the amount of pixel shift in the horizontal direction represented by $\Delta Lx$ satisfy A and B given below:

$$Min(Lpy-Dy,\ Dy/2) \leq \Delta Ly \leq Max(Dy,\ Lpy-Dy/2)$$

and $$Min(Lpx-Dx,\ Dx/2) \leq \Delta Lx \leq Max(Dx,\ Lpx-Dx/2)$$

wherein:

Lpy is a vertical pitch length of a fixed pixel,

Lpx is a horizontal pitch length of a fixed pixel,

Dy is a vertical aperture of a fixed pixel,

Dx is a horizontal aperture of a fixed pixel, and

Min (a,b) and Max (a,b) are functions which give smallest and largest values of a and b, respectively.

6. The method for driving a display device as claimed in claim 1, and further comprising the step of disposing a quarter-wave plate on an optical axis of said light beam emitted from said display elements and at a stage following said wobbling element.

7. The method for driving a display device as claimed in claim 1, including applying the method to projector devices.

8. A display device comprising:

display elements having discrete fixed pixels formed of display element passing light beams from a light source, the light beams being obtained by sampling video signals in every video field;

wobbling elements for selectively wobbling a light beam emitted from said display elements;

a timing generating circuit for maintaining a timing of sampling while scanning a first field and for shifting a timing of sampling while scanning a second field by a period of time corresponding to an amount of pixel shift in a horizontal direction resulting from wobbling by said wobbling elements;

driver circuits for driving said display elements and said wobbling elements in each of said video fields with a timing signal from the timing generating circuit;

wherein said wobbling elements comprise a phase modulation optical element, a first birefringent medium, a half-wave plate, and a second birefringent medium disposed sequentially and said phase modulation element is controlled by said timing generating circuit to impart no time shift caused by phase modulation in said first field and to impart a time shift caused by phase modulation in said second field; and a polarization plane of a light beem having passed said first birefringent medium is rotated by 90 degrees by said half-wave plate to be led to said second birefringent medium, and pixel shifts in the vertical and horizontal directions are performed independently of each other by said first birefringent medium and said second birefringent medium only in said first field.

9. The display device as claimed in claim 8, wherein said period of time corresponding to an amount of pixel shift is a period of time corresponding to an amount of pixel shift in the horizontal direction resulting from said wobbling.

10. The display device as claimed in claim 8, wherein said wobbling is generated for a period of time of a synchronizing signal for scanning each of said video fields, and a pixel shift in the vertical direction is accomplished simultaneously with a pixel shift in said horizontal direction.

11. The display device as claimed in claim 10, wherein an amount of pixel shift in the vertical direction represented by $\Delta Ly$ and an amount of pixel shift in the horizontal direction represented by $\Delta Lx$ satisfy:

$$Min(Lpy-Dy,\ Dy/2) \leq \Delta Ly \leq Max(Dy,\ Lpy-Dy/2)$$

and $$Min(Lpx-Dx,\ Dx/2) \leq \Delta Lx \leq Max(Dx,\ Lpx-Dx/2)$$

wherein:

Lpy is a vertical pitch length of a fixed pixel,

Lpx is a horizontal pitch length of a fixed pixel,

Dy is a vertical aperture of a fixed pixel,

Dx is a horizontal aperture of a fixed pixel, and

Min (a, b) and Max (a, b) are functions which give smallest and largest values of a and b, respectively.

12. The display device as claimed in claim 8, wherein said amount pixel shift is selected to minimize an overlapping of said fixed pixels and the pixels shifted by said wobbling elements.

13. The display device as claimed in claim 8, further comprising a quarter-wave plate disposed on an optical axis of said light beam at a stage following said wobbling elements.

* * * * *